(12) United States Patent
Cobb et al.

(10) Patent No.: US 8,167,430 B2
(45) Date of Patent: May 1, 2012

(54) UNSUPERVISED LEARNING OF TEMPORAL ANOMALIES FOR A VIDEO SURVEILLANCE SYSTEM

(75) Inventors: Wesley Kenneth Cobb, The Woodlands, TX (US); Ming-Jung Seow, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 435 days.

(21) Appl. No.: 12/551,364

(22) Filed: Aug. 31, 2009

(65) Prior Publication Data

US 2011/0051992 A1    Mar. 3, 2011

(51) Int. Cl.
*G03B 1/48* (2006.01)
*G06K 9/00* (2006.01)

(52) U.S. Cl. ............................ 352/225; 352/52; 382/103

(58) Field of Classification Search .................. 382/100, 382/103, 106, 107, 155, 162, 168, 173, 181, 382/193, 199, 209, 218, 219, 224, 232, 254, 382/274, 276, 282, 286–294, 305, 312; 340/573.1, 340/948; 707/791; 352/52, 225
See application file for complete search history.

(56) References Cited

U.S. PATENT DOCUMENTS

| | | |
|---|---|---|
| 4,679,077 A | 7/1987 | Yuasa et al. |
| 5,113,507 A | 5/1992 | Jaeckel |
| 5,748,775 A | 5/1998 | Tsuchikawa et al. |
| 5,751,378 A | 5/1998 | Chen et al. |
| 5,969,755 A | 10/1999 | Courtney |
| 6,252,974 B1 | 6/2001 | Martens et al. |
| 6,263,088 B1 | 7/2001 | Crabtree et al. |
| 6,570,608 B1 | 5/2003 | Tserng |
| 6,661,918 B1 * | 12/2003 | Gordon et al. ................ 382/173 |
| 6,674,877 B1 * | 1/2004 | Jojic et al. ..................... 382/103 |
| 6,678,413 B1 * | 1/2004 | Liang et al. ................... 382/181 |
| 6,856,249 B2 * | 2/2005 | Strubbe et al. ............. 340/573.1 |
| 6,940,998 B2 * | 9/2005 | Garoutte ....................... 382/103 |
| 7,076,102 B2 * | 7/2006 | Lin et al. ...................... 382/218 |
| 7,136,525 B1 | 11/2006 | Toyama et al. |
| 7,158,680 B2 | 1/2007 | Pace |
| 7,200,266 B2 * | 4/2007 | Ozer et al. .................... 382/173 |
| 7,227,893 B1 | 6/2007 | Srinivasa et al. |

(Continued)

FOREIGN PATENT DOCUMENTS

WO    2009049314 A2    4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Seyed Azarian
(74) *Attorney, Agent, or Firm* — Patterson & Sheridan, LLP

(57) ABSTRACT

Techniques are described for analyzing a stream of video frames to identify temporal anomalies. A video surveillance system configured to identify when agents depicted in the video stream engage in anomalous behavior, relative to the time-of-day (TOD) or day-of-week (DOW) at which the behavior occurs. A machine-learning engine may establish the normalcy of a scene by observing the scene over a specified period of time. Once the observations of the scene have matured, the actions of agents in the scene may be evaluated and classified as normal or abnormal temporal behavior, relative to the past observations.

25 Claims, 6 Drawing Sheets

U.S. PATENT DOCUMENTS

| | | | |
|---|---|---|---|
| 7,436,887 B2 | 10/2008 | Yeredor et al. | |
| 7,606,425 B2 * | 10/2009 | Bazakos et al. | 382/224 |
| 7,825,954 B2 | 11/2010 | Zhang et al. | |
| 7,868,912 B2 | 1/2011 | Venetianer et al. | |
| 7,882,135 B2 * | 2/2011 | Brunner et al. | 707/791 |
| 2003/0107650 A1 | 6/2003 | Colmenarez et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0165386 A1 | 7/2006 | Garoutte | |
| 2006/0190419 A1 | 8/2006 | Bunn et al. | |
| 2006/0222206 A1 | 10/2006 | Garoutte | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

UNSUPERVISED LEARNING OF TEMPORAL ANOMALIES FOR A VIDEO SURVEILLANCE SYSTEM

BACKGROUND OF THE INVENTION

1. Field of the Invention

Embodiments of the invention provide techniques for analyzing a sequence of video frames. More specifically, embodiments of the invention provide techniques for learning of temporal anomalies in an unconstrained scene.

2. Description of the Related Art

Some currently available video surveillance systems provide simple object recognition capabilities. For example, a video surveillance system may be configured to distinguish between scene foreground (active elements) and scene background (static elements) depicted in a video stream. A group of pixels (referred to as a "blob") depicting scene foreground may be identified as an active agent in the scene. Once identified, a "blob" may be tracked from frame-to-frame, allowing the system to follow and observe the "blob" moving through the scene over time, e.g., a set of pixels believed to depict a person walking across the field of vision of a video surveillance camera may be identified and tracked from frame-to-frame.

Some such systems may also classify a blob as being a particular agent (e.g., a person or a vehicle). Further, such systems may be configured to determine when an object has engaged in certain predefined behaviors. Typically, such systems determine when an observed behavior (as represented by changes in pixel color values over some number of frames) matches a pre-defined definition or pattern. For example, such a system may be configured to issue an alert whenever pixels believed to depict a vehicle are observed driving the wrong direction down a one-way street (based on changes in spatial position over multiple frames). Similarly, such systems may allow a user to specify a virtual "trip-wire" where a region of a scene represents a predefined area where activity may be deemed to be unusual. For example, consider a camera used to monitor a subway platform, in such a case, a user could configure the system to generate an alert anytime a foreground blob believed to depict a person is detected in a zone specified as being the tracks for subway trains (i.e., when a person is walking on the train tracks).

However, such surveillance systems typically require that the objects and/or behaviors which may be recognized by the system to be defined in advance or at least require the user to specify zones where activity should result in an alert. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" or "anomalous" is defined in advance and separate software products are required to recognize additional objects or behaviors. This results in video surveillance systems with recognition capabilities that are labor intensive and prohibitively costly to maintain or adapt for different specialized applications.

Thus, currently available video surveillance systems are typically unable to recognize new patterns of behavior that may emerge in a given scene or recognize changes in existing patterns. More generally, such systems are often unable to identify objects, events, behaviors, or patterns (or classify such objects, events, behaviors, etc., as being normal or anomalous) by observing what happens in the scene over time; instead, such systems rely on static patterns defined in advance.

SUMMARY OF THE INVENTION

Embodiments of the invention relate to techniques for analyzing a scene captured by a video camera or other recorded video. One embodiment provides a computer-implemented method for analyzing a sequence of video frames depicting a scene captured by a video camera. The method may generally include receiving a set of kinematic data derived by a computer vision engine observing a foreground object in one of the frames of video, receiving temporal data specifying when the foreground object was observed in one of the frames of video, and passing the set of kinematic data and the temporal data to an adaptive resonance theory (ART) network. The ART network models observed behavior of a plurality of foreground objects observed in the scene, relative to the kinematic data and the temporal data. The method may also include evaluating one or more clusters of the ART network to determine whether the set of kinematic data and temporal data passed to the ART network are indicative of an occurrence of a temporally anomaly and, upon determining a temporal anomaly has occurred, publishing an alert message.

Another embodiment of the invention includes a computer-readable storage medium containing a program which, when executed by a processor, performs an operation for analyzing a sequence of video frames depicting a scene captured by a video camera. The operation may generally include receiving a set of kinematic data derived by a computer vision engine observing a foreground object in one of the frames of video, receiving temporal data specifying when the foreground object was observed in one of the frames of video, and passing the set of kinematic data and the temporal data to an adaptive resonance theory (ART) network. The ART network models observed behavior of a plurality of foreground objects observed in the scene, relative to the kinematic data and the temporal data. The operation may further include evaluating one or more clusters of the ART network to determine whether the set of kinematic data and temporal data passed to the ART network are indicative of an occurrence of a temporally anomaly and, upon determining a temporal anomaly has occurred, publishing an alert message.

Still another embodiment of the invention provides a video surveillance system. The video surveillance system may generally include a video input source configured to provide a sequence of video frames, each depicting a scene, a processor, and a memory containing a program, which, when executed on the processor is configured to perform an operation for analyzing the scene, as depicted by the sequence of video frames captured by the video input source. The operation may generally include receiving a set of kinematic data derived by a computer vision engine observing a foreground object in one of the frames of video, receiving temporal data specifying when the foreground object was observed in one of the frames of video, and passing the set of kinematic data and the temporal data to an adaptive resonance theory (ART) network. The ART network models observed behavior of a plurality of foreground objects observed in the scene, relative to the kinematic data and the temporal data. The operation may further include evaluating one or more clusters of the ART network to determine whether the set of kinematic data and temporal data passed to the ART network are indicative of an occurrence of a temporally anomaly and, upon determining a temporal anomaly has occurred, publishing an alert message.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
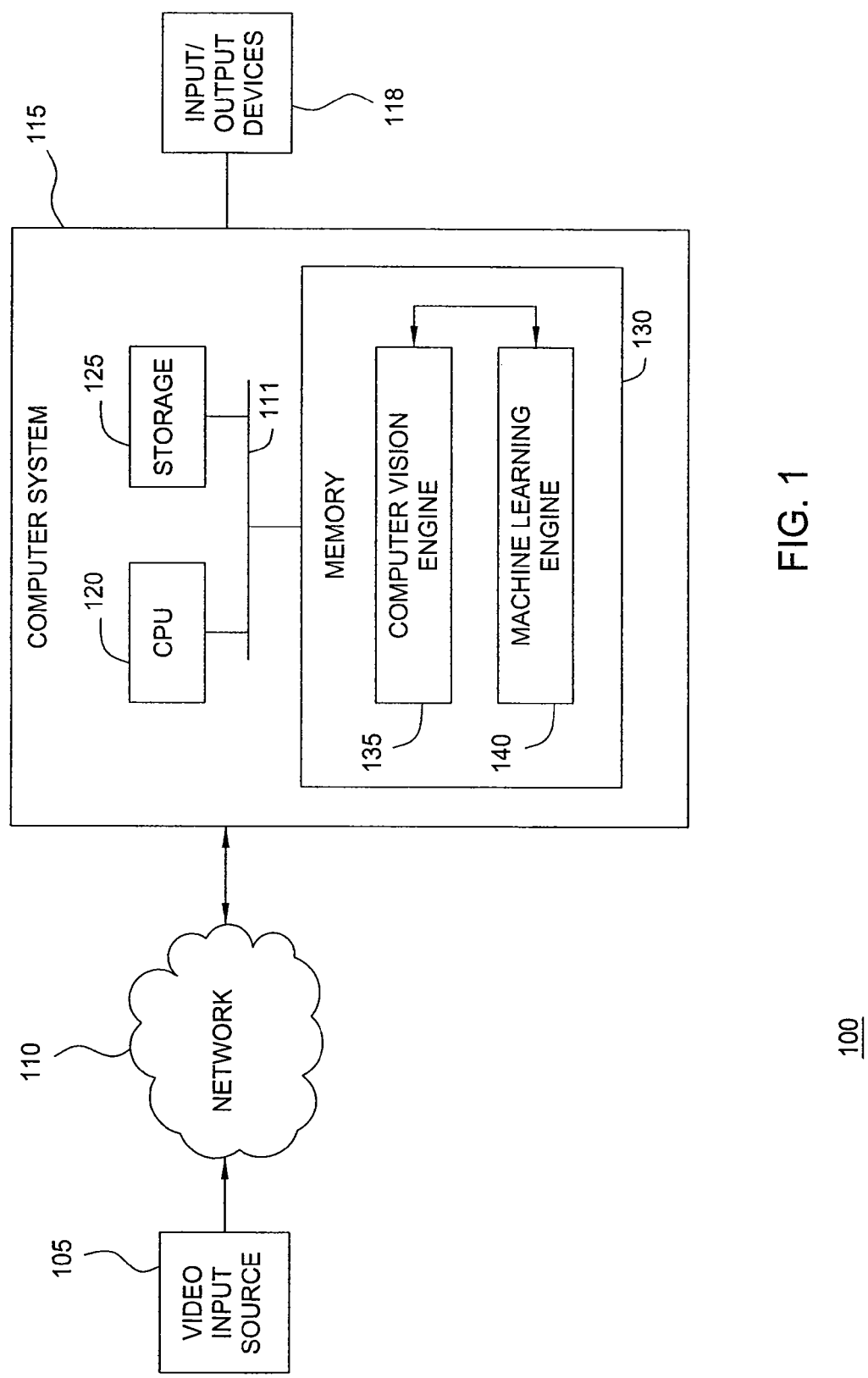
FIG. 1 illustrates components of a video surveillance system, according to one embodiment of the invention.

Embodiments of the invention provide techniques for analyzing a stream of video frames to identify temporal anomalies. More specifically, one embodiment includes a video surveillance system configured to identify when agents depicted in a video stream engage in anomalous behavior, relative to the time-of-day (TOD) or day-of-week (DOW) at which the behavior occurs. In one embodiment, a machine-learning engine may establish the normalcy of a scene by observing the scene over a specified period of time. Once the observations of the scene have matured, the actions of agents in the scene may be evaluated and classified as normal or abnormal temporal behavior, relative to the past observations.

In one embodiment, the video surveillance system generates a background model representing the background elements of a scene. The background model generally represents the static elements of a scene captured by a video camera. For example, consider a video camera trained on a stretch of highway. In such a case, the background would include the roadway surface, the medians, any guard rails or other safety devices, and traffic control devices, etc., visible to the camera. The background model may include an expected pixel color value for each pixel of the scene when the background is visible to the camera. Thus, the background model provides a rough image of the scene in which no activity is occurring (e.g., an empty roadway). Conversely, vehicles traveling on the roadway (and any other person or thing engaging in some activity) occlude the background when visible to the camera and represent scene foreground objects.

Once the background model has matured, the computer vision engine may compare the pixel values for subsequent frames with the background image and identify objects as they appear and move about the scene. Typically, when a region of pixels in the scene (referred to as a "blob" or "patch") is classified as depicting foreground, the patch itself is identified as a foreground object. Once identified, the computer vision engine may derive a broad variety of kinematic data while tracking the foreground object from frame-to-frame, e.g., position, current (and projected) direction, orientation, velocity, and acceleration of the object, as well as other information such as size, color shininess, rigidity, height/width in pixels, average color values, shape, area, etc. In one embodiment, information derived by the computer vision engine may be used to both classify the object as being a particular agent type (e.g., as being a vehicle or a person) as well as track the object from frame-to-frame.

The computer vision engine may output the derived information as a stream of "context events" describing both the kinematic data (e.g., the position, direction, and velocity, etc.) and any available micro-features (e.g., the shininess, rigidity, area, etc.) derived for each foreground object detected in the video frames. The computer vision engine may output the stream of context events related to each object observed in the scene at a fixed rate (e.g., 5 Hz).

As described in greater detail herein, the context events (i.e., the kinematic data and the micro-feature data) output from the computer vision engine may be supplied to the machine-learning engine. In one embodiment, the machine-learning engine may include a temporal anomaly detector configured to evaluate the context events (i.e., the kinematic data) to determine whether an observed agent (i.e., a foreground object) is engaging in normal or anomalous behavior, based on both the observations of other agents of the same agent type as well as on the time-of-day (TOD) or day-of-week (DOW) when the activity is observed to occur.

In one embodiment, a temporal anomaly detector may include a time-of-day engine (TOD) and a day-of-week (DOW) engine used to model the behavior of agents observed in a scene. In particular, the TOD and DOW engines may utilize a set of adaptive resonance theory (ART) networks to learn the temporal behavior of a given scene. The ART networks may be configured to create, modify, remove, or merge observations (more precisely the kinematic data) received from the computer vision engine. For example, the ART networks may model different categories of temporal observation, including TOD recurring events (e.g., the time of day at which people appear at a given position in the scene) and DOW recurring events (e.g., the days of the week that cars park in a parking structure). Of course, embodiments of the invention may be adapted to model recurring events using other temporal frequencies (e.g., month-of-year).

Additionally, as events occur (and re-occur) the machine-learning engine may create, encode, store, retrieve, and reinforce patterns representing the events observed to have occurred, e.g., a long-term memory encoding a pattern generated from multiple observations of a car parking in the scene. And patterns representing an event of interest may result in alerts passed to users of the behavioral recognition system. Thus, the TOD and DOW engine allow the machine-learning engine to discriminate events based on a time that does not require user intervention.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, software routines composed to implement embodiments of the invention may be part of an operating system or a specific application, component, program, module, object, or sequence of instructions. Computer programs implementing embodiments of invention typically include a collection of source code files that may be compiled (or interpreted) into a machine-readable format and hence executable instructions. Additionally, multiple applications may interact with one another, e.g., a user-application program may interact with another application such as a database to provide an intended service or function. Also, such programs typically include variables and data structures that may reside in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As noted above, the computer vision engine 135 may be configured to analyze this raw information to identify active objects in the video stream, classify the objects, derive a variety of metadata regarding the actions and interactions of such objects, and supply this information to a machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI interface screen. In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 analyzes each frame in real-time to derive a set of information about what is occurring within a given frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
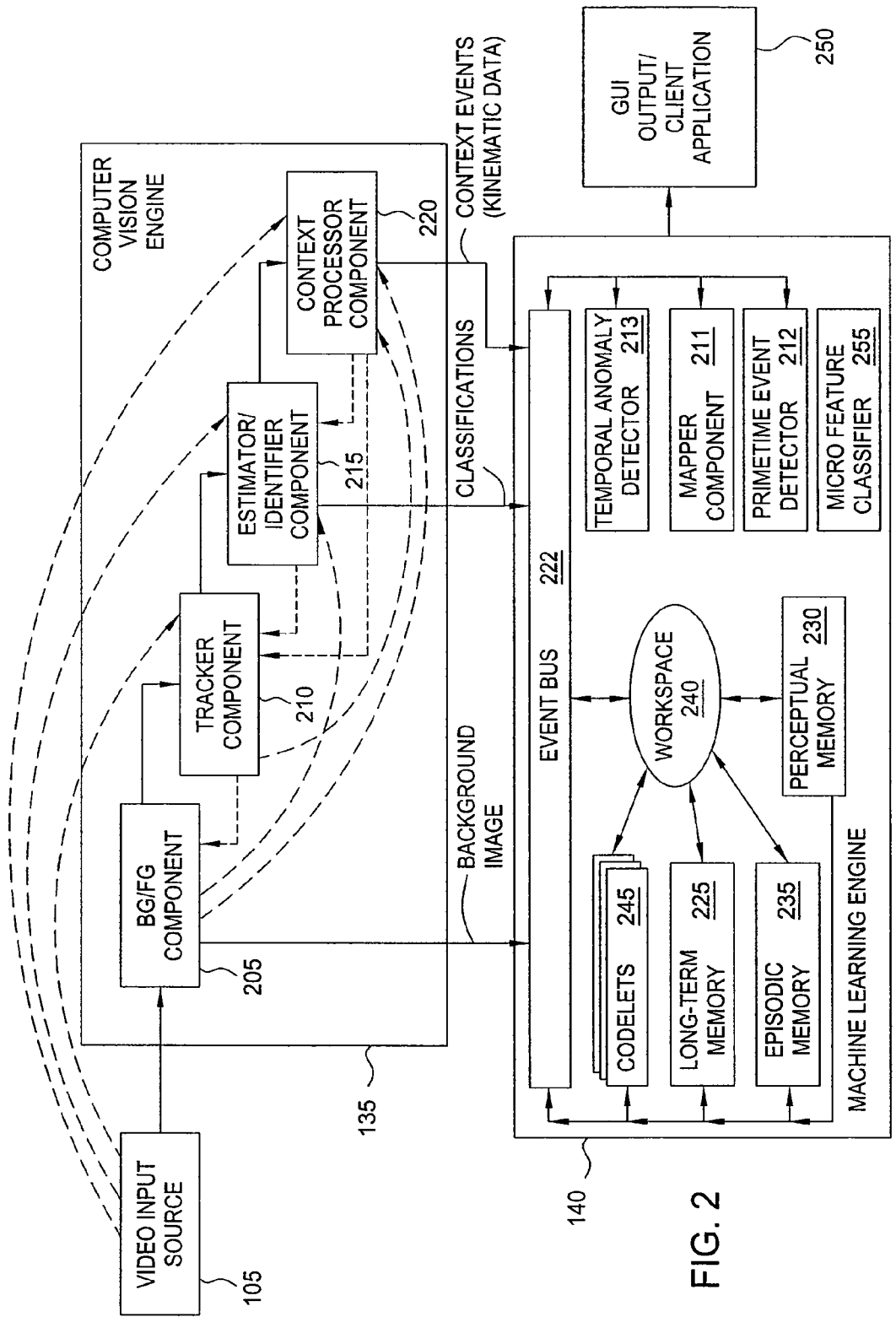
FIG. 2 further illustrates components of the video surveillance system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed) from a video surveillance system.

In one embodiment, the BG/FG component 205 may be configured to separate each frame of video provided by the video input source 105 into a stationary or static part (the scene background) and a collection of volatile parts (the scene foreground). The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. In such a case, mature clusters in the ART network modeling a given pixel are presumed to model a background state and pixel color values in an input frame mapping to a mature cluster are presumed to depict scene background in that frame, where pixels mapping to an immature cluster (or to a new cluster) are presumed to depict an element of a foreground object (or an emergent background state). Of course, other approaches to distinguish between scene foreground and background may be used.

Additionally, the BG/FG component 205 may be configured to generate a mask used to identify which pixels of the scene are classified as depicting foreground and, conversely, which pixels are classified as depicting scene background. The BG/FG component 205 then identifies (contiguous) regions of the scene that contain a portion of scene foreground (referred to as a foreground "blob" or "patch") and supplies this information to subsequent stages of the pipeline.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and classify each tracked object as being one of a known category of objects. In one embodiment, the estimator/identifier component 215 may use a trained classifier trained using a collection of training examples (positive and/or negative). Once trained, the classifier may be used to assign one of a set of pre-defined classifications (based on the training examples) to a tracked object, e.g., to classify a foreground object as being a "person," a "vehicle," an "unknown," or an "other." In this context, the classification of "other" represents an affirmative assertion that the object is neither a "person" nor a "vehicle."

Alternatively, the estimator/identifier component 215 may derive a variety of micro features characterizing different aspects of a foreground object, e.g., size, height, width, and area (in pixels), reflectivity, shininess rigidity, speed velocity, etc. In the latter case, the machine-learning engine 140 may be configured to classify different foreground objects as being instances of a common object type, based on the similarity of one objects' micro features to others. This approach allows distinct object types to emerge from the clustering of micro features (e.g., using an ART network to cluster the micro features). For example, the micro features of multiple vehicles may all be clustered as being instances of a common agent type. In such a case, the estimator/identifier component 215 does not classify an observed vehicle as being a "vehicle" directly, but instead, as being an instance of an arbitrary object type having micro features similar to other vehicles observed by the computer vision engine 135.

The context processor component 220 may receive the output from other stages of the pipeline (i.e., the tracked objects, the background and foreground models, and the results of the estimator/identifier component 215). In one embodiment, the context processor 220 may generate a stream of context events regarding objects tracked (by tracker component 210) and evaluated (by estimator identifier component 215). For example, the context processor component 220 may package a stream of micro feature vectors and kinematic observations of an object and output this to the machine-learning engine 140, e.g., a rate of 5 Hz.

In one embodiment, the context events are packaged as being part of a trajectory associated with a given foreground object. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of becoming part of the scene background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the observations of motions and actions of the tracked objects in the scene and supply this information to the machine-learning engine 140. Illustratively, the machine-learning engine 140 includes a long-term memory 225, a perceptual memory 230, an episodic memory 235, a workspace 240, codelets 245, a micro feature classifier 255, a temporal anomaly detector 213, a mapper component 211, and a primitive event detector 212. Additionally, the machine-learning engine 140 includes a client application 250, allowing users to interact with the video surveillance system 100 using a graphical user interface. The machine-learning engine 140 also includes an event bus 222. In one embodiment, the components of the computer vision engine 135 and machine-learning engine 140 output data to the event bus 222. At the same time, the components of the machine-learning engine 140 may subscribe to receive different events streams from the event bus 222. For example, the temporal anomaly detector 213 may subscribe to receive the kinematic data output from the computer vision engine 135 and use this information to construct models of recurring behavior, as well as identify when a foreground object has engaged in some anomalous activity (relative to previous observations).

In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates the kinematic data regarding the car's position and velocity. In such a case, this information is supplied to the machine learning engine 140 and the primitive event detector 212. In turn, the primitive event detector 212 may generate a semantic symbol stream corresponding to a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," "person leaves scene" "person appears in scene," "person moves proximate to vehicle," "person disappears," "vehicle starts moving," and "vehicle disappears." In one embodiment, the primitive event stream may be supplied to excite the perceptual associative memory 230. In turn, the perceptual associate memory (e.g., a neural network and the episodic and long term memories may evaluate the sequences of primitive events to identify, learn, and update what patterns of behavior are prevalent in the scene observed by the computer vision engine 135.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, as well as schedule codelets 245 for execution. In one embodiment, each codelet 245 is a software program configured to evaluate different sequences of events and to determine how one sequence may follow (or otherwise relate to) another (e.g., a finite state machine). More generally, a codelet may provide a software module configured to identify and/or detect interesting patterns from the streams of data fed to the machine-learning engine 140. In turn, the codelet 245 may create, retrieve, reinforce, or modify memories in the episodic memory 235 and the long-term memory 225, update data structures (e.g., ART networks) maintained by the temporal anomaly detector 213 and/or mapper component 211. By repeatedly scheduling codelets 245 for execution, the machine-learning engine 140 performs a cognitive cycle used to observe, and learn, about patterns of behavior that occur within the scene.

In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream). The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

In contrast, the long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The mapper component 211 may receive the context event stream (e.g., kinematic data and micro feature data) and parse the information to multiple ART networks to generate statistical models of what occurs in the scene. An ART network provides a specialized neural network configured to create clusters from vector inputs of N elements. For example, an ART network may receive a vector as input and either update an existing cluster or create a new cluster, as determined using a choice test and a vigilance test for the ART network. Each cluster itself may be characterized by a mean and a variance from a prototype input representing that cluster. The mean specifies a center location for the cluster (in an N-dimensional space for N elements) and the variance specifies a radius of the cluster. The prototype is generated first, as a copy of the input vector used to create a new cluster. Subsequently, the prototype may be updated as new inputs are mapped to that cluster.

In context of embodiments of the present invention, the vector may include attributes related to a foreground object, e.g., for an object in a frame of video classified as a person, the vector may include a position of (x, y) and having a height (h) and width (w) (in pixels). As the computer vision engine 135 observes may different people are in the video stream, an ART network may model a distribution of position and size—allowing the machine-learning engine 140 to distinguish between expected (or normal) and unexpected (or anomalous) events. Other examples include an ART network modeling where a person is observed by the computer vision engine 135 to appear or disappear at an (x, y) position within the scene or modeling observations of a velocity or acceleration of a person at (x, y) positions in the scene.

As stated, inputs are mapped to clusters in an ART network using a choice test and a vigilance test. The choice and vigilance tests are used to evaluate the vector passed to the ART network and select what cluster to map the inputs to (or create a new cluster). The choice test generally provides a ranking of the existing clusters, relative to the vector input data. Once ranked, the vigilance test evaluates the existing clusters to determine whether to map the input to a given cluster. If no cluster is found to update using the data supplied to the input layer, evaluated sequentially using the ranked clusters, then a new cluster is created. That is, once a pattern is found (i.e., the input "matches" an existing cluster according to the choice and vigilance tests), the prototype for that cluster is updated based on the values of the input vector moving the cluster slightly towards the input pattern (in the N-dimensional space of the ART network). Otherwise, if the input vector does not match any available cluster (using the vigilance test), the ART network may create a new cluster by storing a new pattern similar to the input vector. Subsequent input vectors that most closely resemble the new cluster (relative to the others) are then used to update that cluster.

The vigilance parameter has considerable influence on an ART network: higher vigilance produces many, fine-grained clusters, where a while lower vigilance results in more-general clusters. Further, the inputs may be binary values (generally referred to as an ART1 network), or may be continuous values (generally referred to as an ART2 network). Other variations of the ART network include ART3, ARTMAP, and FUZZY ART networks.

As stated, inputs mapping to an existing ART network cluster are used to update a mean and variance for each dimension of the ART network, changing the position, shape and size of the cluster. Alternatively, the clusters may be defined using a mean and a covariance. Doing so results in a more accurate boundary for each cluster. However, using a covariance approach increases the computational complexity. Thus, the actual approach may be tailored to suit the needs of a particular case. Further, by projecting the cluster into a two-dimensional plane (x, y), the resulting shape and position of the cluster correspond to a region in the scene where the events being categorized by the ART network have been observed. Thus, for an ART network categorizing the position (and pixel width and height) of a person, each cluster identifies an area in the scene where people have, e.g., appeared, disappeared, or simply been observed to be present and an expected range for the height and width (in pixels) for persons observed at the particular position.

Additionally, in one embodiment, the machine-learning engine 140 may characterize the ART network clusters in mapper 211 (and temporal anomaly detector 213) by how many input vectors have been used to update that cluster—after it is initially created. Typically, the more input vectors that are mapped to a given cluster, the greater the significance of that cluster. In one embodiment, a cluster is considered "mature" once a predefined number of inputs have mapped to that cluster. Conversely, a cluster that does not receive input (i.e., is reinforced) for a specified period of time may be removed. That is, in one embodiment, ART network clusters managed by the mapper component 211 (and the temporal anomaly detector 213) may provide for cluster decay. For example, each ART network may be configured to require that a cluster be periodically reinforced in order to remain in a given ART network. In such a case, if a new cluster is created, but no new inputs have been mapped to that cluster for a specified period, then that cluster may be removed from the particular ART network. Doing so improves the efficiency of the ART network by not retaining clusters of little (or no) significance. Further, doing so helps to account for the reality that the events observed in a scene are expected to change over time. That is, while a cluster may be significant at one time (e.g., because people are repeatedly observed to appear at a first location), the patterns of behavior being observed may change (e.g., people being observed to appear at a second location).

The micro feature classifier 255 evaluates the micro feature vectors output by the computer vision engine 135. As noted, the computer vision engine 135 may track objects frame-to-frame and generate micro feature vectors for each foreground object at a rate of, e.g., 5 Hz. In one embodiment, the micro feature classifier 255 may be configured to create clusters from this stream of micro feature vectors. For example, each micro feature vector may be supplied to an input layer of the ART network (or a combination of a self organizing map (SOM) and ART network used to cluster nodes in the SOM). In response, the ART network maps the micro feature vector to a cluster in the ART network and updates that cluster (or creates a new cluster of the input micro feature vector is sufficiently dissimilar to the existing clusters). Each cluster is presumed to represent a distinct object type, and objects sharing similar micro feature vectors (as determined using the choice and vigilance parameters of the ART network) are mapped to the same cluster.

For example, the micro features associated with observations of many different vehicles may be similar enough to map to the same cluster (or small group of clusters). At the same time, observations of many different people may map to a different cluster (or small group of clusters). Thus, each distinct cluster in the art network generally represents a distinct type of object acting within the scene. And as new objects enter the scene, new object types may emerge in the ART network. Importantly, however, this approach does not require the different object type classifications to be defined in advance; instead, object types emerge over time as distinct clusters in the ART network. In one embodiment, the micro feature classifier 255 may assign an object type identifier to each cluster, providing a different object type for each cluster in the ART network.

In an alternative embodiment, rather than generate clusters from the micro features vector directly, the micro feature classifier 255 may supply the micro feature vectors to a self-organizing map structure (SOM). In such a case, the ART network may cluster nodes of the SOM—and assign an object type identifier to each cluster. In such a case, each SOM node mapping to the same cluster is presumed to represent an instance of a common type of object.

Like the ART networks maintained by the mapper component 211 and the micro feature classifier 255 (which provide statistical models of events observed to occur in the scene) the temporal anomaly detector 213 may model the behavior of agents acting in the scene. In particular, the temporal anomaly detector 213 may model the observed behavior of foreground objects across multiple temporal dimensions, e.g., a time-of-day (TOD) dimension and/or a day-of-week (DOW) dimension.

Figure 3:
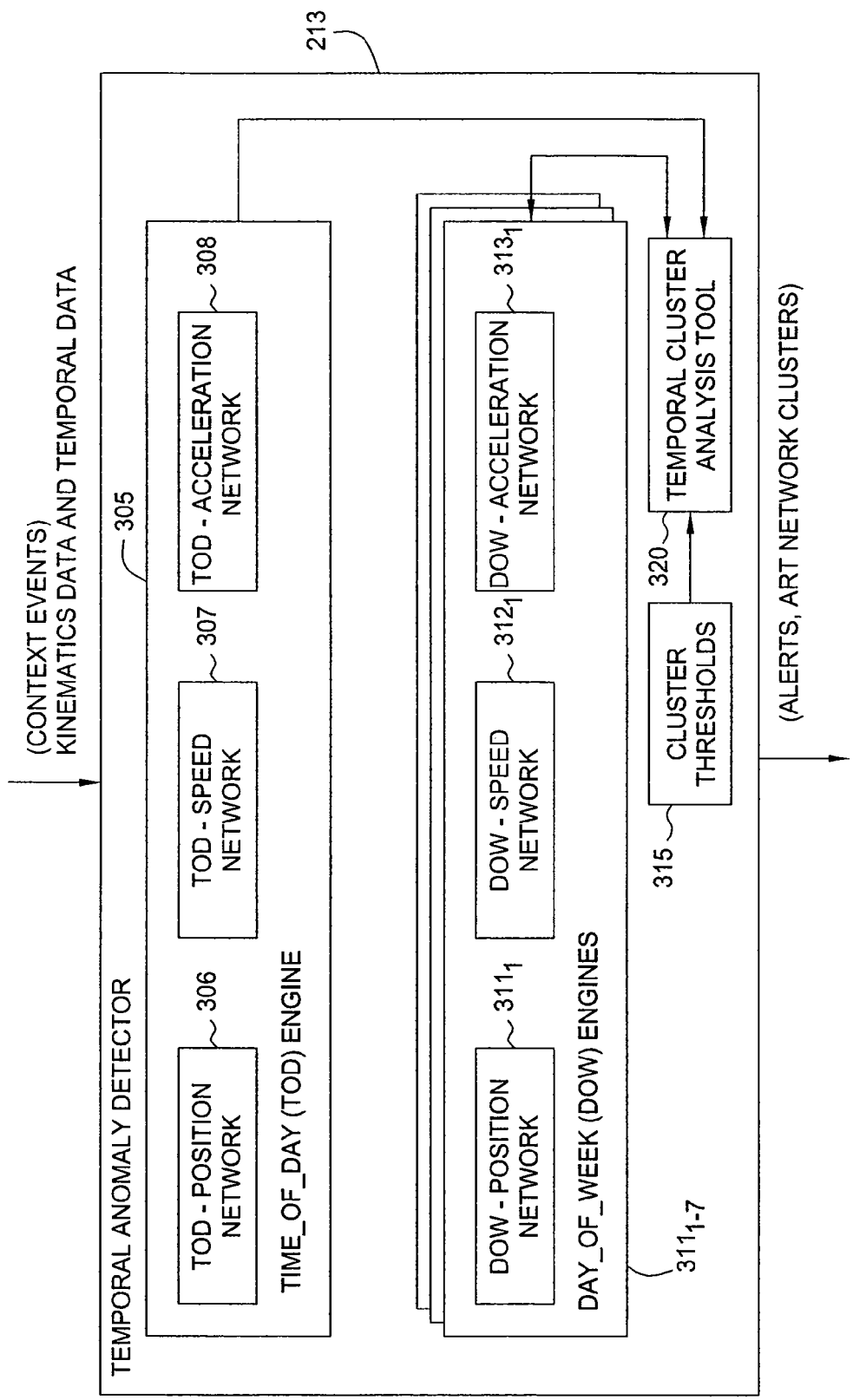
FIG. 3 further illustrates a temporal anomaly detector component first shown in FIG. 2, according to one embodiment of the invention.

FIG. 3 further illustrates the temporal anomaly detector 213 first shown in FIG. 2, according to one embodiment of the invention. As shown, the temporal anomaly detector 213 includes a time-of-day (TOD) engine 305 and a day-of-week (DOW) engine 310. In one embodiment, the TOD engine 305 and DOW engines $310_{1-7}$ include ART networks used to model behavior across time-of-day and day-of-week dimensions, respectively. In this example, the TOD engine 305 includes a TOD-position network 306, a TOD-speed network 307, and a TOD-acceleration network 308, and the DOW engine $310_1$ includes a DOW-position network $311_1$, a DOW-speed network $312_1$, and a DOW-acceleration network $313_1$. As shown, temporal anomaly detector 213 also includes cluster thresholds 315 and a temporal cluster analysis tool 320.

The cluster analysis tool 320 may evaluate the ART networks to identify temporal anomalies, i.e., to classify observations of behavior as being anomalous, relative to a time of day or day of week. For example, the cluster analysis too may evaluate the TOD-position network 306 to determine whether an observed position of an object, relative to a time of day, should be classified as being a temporal anomaly and whether to issue an alert regarding the occurrence of an anomalous event. In one embodiment, the TOD-position network 306 may consume a spatial position (x, y), size (h, w) and a time of day from the context event stream. The spatial position may refer to a pixel position within a frame of video and the size may be specified using the height and width of an object, measured in pixels. The time-of-day may be specified in minutes ranging from 1-1440 (representing the number of minutes in a day). In turn, the (x, y) position, size (h, w), and importantly, time-of-day, are mapped to a cluster in the TOD-position network 306 (or used to create a new cluster).

The TOD-speed network 307 may be used to determine whether an object has an anomalous speed (high or low) for a particular time of day, relative to prior observations. In one embodiment, the TOD-speed network 307 may consume a spatial position (x, y), a time-of-day (in minutes ranging from 1-1440), and a velocity ($V_x$, $V_y$) from the context event stream. The velocity $V_x$ refers to a velocity in the horizontal direction and the velocity $V_y$ refers to a velocity in the in the vertical direction. In turn, these inputs are mapped to a cluster in the TOD-speed network 307 (or used to create a new cluster). Of course, other velocities may be used (e.g., a combination of the $V_x$, and $V_y$ velocities) to evaluate the speed of an object in a frame of video, relative to a time-of-day.

Similarly, the TOD-acceleration network 308 may be used to determine whether the rate of change in the velocity of an object is anomalous (high or low) for a particular time of day, relative to prior observations. In one embodiment, the TOD-acceleration network 307 may consume a spatial position (x, y), a time-of-day (in minutes ranging from 0-1440), and an acceleration rate ($A_x$, $A_y$) from the context event stream. The acceleration rate $A_x$ refers to an acceleration rate in the horizontal direction and the acceleration rate $A_y$ refers to an acceleration rate in the in the vertical direction. In turn, these inputs are mapped to a cluster in the TOD-acceleration network 308 (or used to create a new cluster). Of course, other velocities may be used (e.g., a combination of the $A_x$, and $A_y$, TOD-acceleration rates) to evaluate the rates at which an object is accelerating (or decelerating) in a frame of video, relative to a time-of-day.

The TOD engine 305 uses the TOD-position network 306, the TOD-speed network 307, and the TOD-acceleration network 308 to create, modify, remove, and merge ART network clusters, based on the observation made in the context events published by the computer vision engine 135. For example, when a new cluster is created in one of these ART networks, a new observation of behavior is said to be made by the particular network. However, that observation can either be a valid observation or an invalid observation at that point. That is, the new cluster may represent an observation of an anomalous behavior or the first observation of behavior that may eventually be classified as normal, as the behaviors in the scene change over time. When a similar observation comparable to that initial observation is made (i.e., when an input to one of the ART networks maps to an existing cluster in that ART network), that cluster is reinforced by updating the mean and variance of that cluster using the input data.

In one embodiment, once a cluster is reinforced a specified number of times, the cluster is said to be "mature," and inputs mapping to that cluster do not result in an alert. Alternatively, inputs mapping to an "immature" cluster (as well as inputs resulting in a new cluster) may be classified as anomalous, and result in an alert being issued to users of the video surveillance system. Further, if no observation is made to reinforce the initial observation (i.e., after a new cluster is first created), the cluster may eventually be removed. Additionally, a merger of multiple clusters may occur when two (or more) clusters overlap in the ART network space by more than a specified percentage.

Like the TOD engine 305, the DOW engines $310_{1-7}$ each include a number of ART networks used to evaluate the observations of objects detected in a stream of video frames; in particular, to determine whether object behavior should be classified as being a temporal anomaly. However, the DOW engines $310_{1-7}$ may be used to model observations of object behavior not just relative to a time of day, but also relative to a day of the week. As shown in FIG. 3, temporal anomaly detector 213 includes seven DOW engines $310_{1-7}$, one for each day of the week. The DOW-position network $311_1$, the DOW-speed network $312_1$, and the DOW-acceleration network $313_1$ may be configured to consume data from the context event stream output from the computer vision engine in a manner similar to as the ART networks described for the TOD engine 305. However, the ART networks in each respective DOW engine $310_{1-7}$ is passed input kinematic data only for observations occurring on the day of week represented by a given ART network in DOW engines $310_{1-7}$. For example, the DOW-position network $311_1$ may consume a spatial position (x, y), size (h, w), and a time of day, as well as a day of the week from the context event stream. In turn, the (x, y) position, size (h, w), and importantly, time of day are and day of week are passed to the appropriate DOW engines $310_{1-7}$ and are mapped to a cluster in the DOW-position network $311_1$ (or used to create a new cluster). In one embodiment, the DOW-speed network $312_1$ and the DOW-acceleration $313_1$ network consume the same elements as specified for the TOD-speed network 307 and the TOD-acceleration network 308 described above, respectively. However, DOW engines $310_{1-7}$ include a DOW-speed network 312 and a DOW-acceleration network 313 for each day of the week. Thus, separate models of behavior may be generated using these ART networks for each day of the week.

Note, in an alternative embodiment, the temporal anomaly detector 213 uses one DOW engine to model all seven days of the week—or different DOW engines 310 for different days of the week combined as may be relevant for a particular case (e.g., one DOW engine 310 to model scene behavior Monday through Friday and another DOW engine 310 to model scene behavior for Saturday and Sunday).

Note, however, one of ordinary skill in the art will recognize that the position, speed, and acceleration parameters used to evaluate object behavior relative to time of day and day of week are examples of object behavior that may be evaluated using the TOD engine 305 and the DOW engine 310. And further, that a broad variety of object characteristics identified by the computer vision engine 135 (e.g., other kinematic observations or micro feature observations) may be evaluated for temporal anomalies relative to time of day or day of week (or relative to other temporal frequencies).

In one embodiment, the temporal cluster analysis tool 320 is configured to evaluate the state of one of the ART networks in the TOD engine 305 and the DOW engine 310 to identify whether a given input should result in the issuance of a temporal anomaly. Further, the temporal cluster analysis tool 320 may monitor the state of the ART networks using parameters specified in cluster thresholds 315. For example, the cluster thresholds 315 may specify a training period for each ART network in the TOD engine 305 and the DOW engine 310. While the training period may be specified as a matter of preference, in one embodiment, the ART networks in the TOD engine 305 have a training period of four days and the DOW engine 310 have a training period of four weeks. That is, the ART networks in the TOD engine 305 consume data from the context event stream for a period of four days before being used to generate alerts, and the ART networks in the DOW engine 310 consume data from the context event stream for a period of four weeks before being used to generate alerts. This allows the ART networks in the TOD engine 305 and the DOW engine 310 to mature before being used to characterize behavior as being anomalous.

In one embodiment, the cluster thresholds 315 may also include parameters specifying when a cluster in one of the ART networks in the TOD engine 305 and the DOW engine 310 should be considered mature (i.e., representative of an observation of normal behavior characterized by the mean and variance of a cluster). For example, the cluster thresholds 315 may specify that a cluster needs to be reinforced a specific number of times (possibly within a specified period of time) before being considered a "mature" cluster (i.e., a cluster representing a normal aspect of object behavior for a given time of day or day of week). The cluster thresholds 315 may also include parameters specifying when cluster should be removed from one of the ART networks in the of the TOD engine 305 or the DOW engine 310, e.g., a threshold specifying how frequently a cluster should be reinforced to avoid being removed from the ART network.

Figure 4:
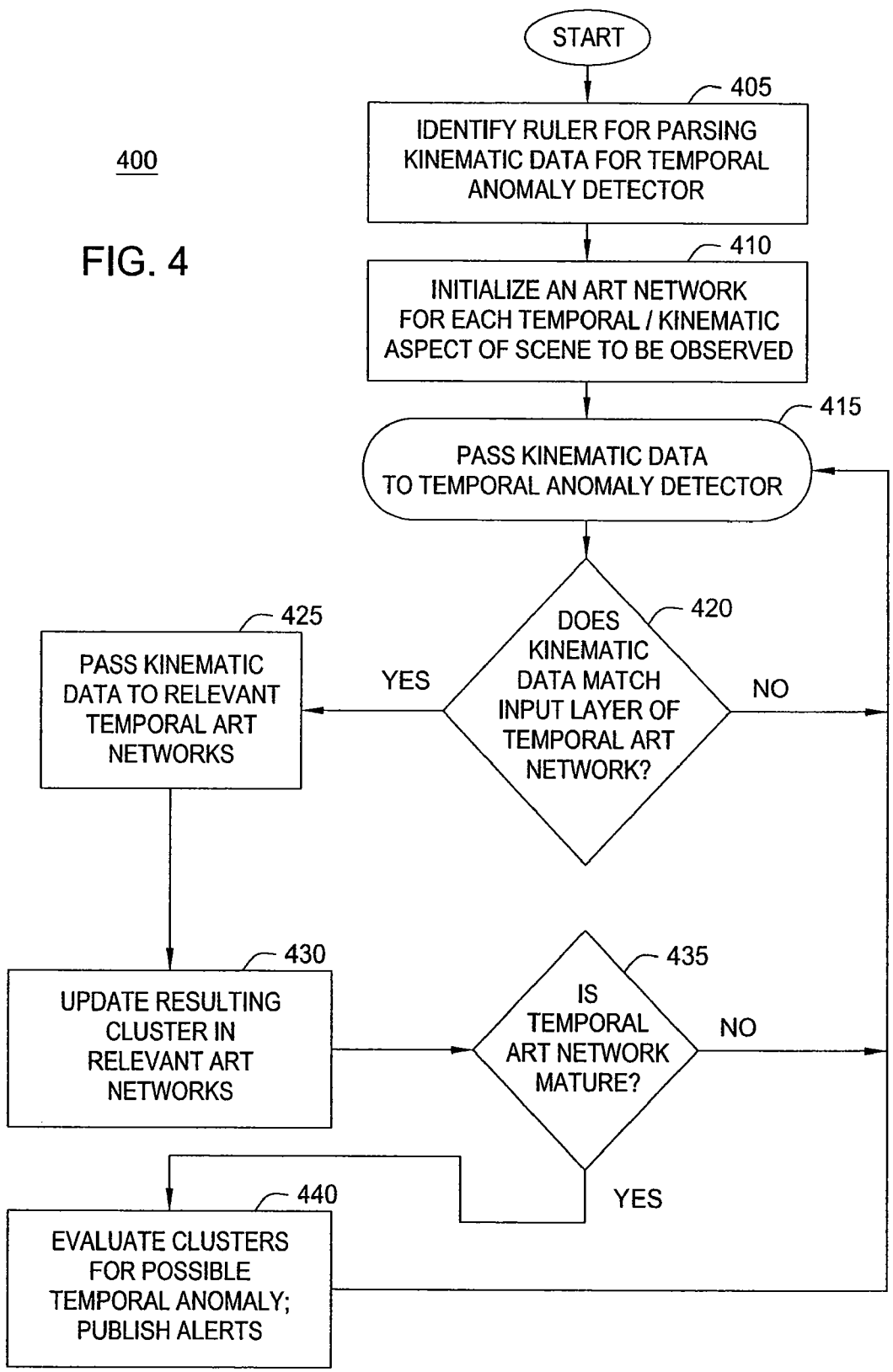
FIG. 4 illustrates a method for parsing data streams to generate inputs for multiple ART networks used by a video surveillance system to identify temporal anomalies, according to one embodiment of the invention.

FIG. 4 illustrates a method 400 for parsing data streams to generate inputs for multiple ART networks used by a video surveillance system to identify temporal anomalies, according to one embodiment of the invention. As shown, the method 400 begins at step 405, where the temporal anomaly detector identifies rules for parsing kinematic data from the computer vision engine. For example, in one embodiment, the temporal anomaly detector may identify groups of inputs such as an agent type (e.g., persons, vehicles, or object types of the micro feature classifier 255), kinematic data (e.g., size, position, velocity, acceleration, etc.), and temporal components (e.g., time of day and/or day of week) to use as input to an ART network, etc.

Once identified, at step 410, the temporal anomaly detector 213 may initialize an ART network for each group of inputs identified at step 405. Once initialized, a loop begins at step 415 where the temporal anomaly detector 213 passes data to the initialized ART networks. For example, the temporal anomaly detector 213 may subscribe to receive the kinematic data from computer vision engine to be parsed to the various ART networks in the TOD engine 305 and/or the DOW engine 310 and indentify context event data (e.g., kinematic and temporal data) matching the inputs layer of one of the ART networks in these engines.

At step 420, the temporal anomaly detector may determine whether a complete set of inputs have been received for one (or more) of the ART networks in the TOD engine 305 and/or the DOW engine 310. That is, the temporal anomaly detector parses the context event stream to identify instances of an input data group. Each input data group corresponds to the input layer of a distinct ART network in the TOD engine 305 or DOW engine 310. If not, the method 400 returns to step 415. Otherwise, once a complete set of kinematic and temporal data is identified that matches one of the ART networks, the temporal anomaly detector 213 sends the relevant context event data to the appropriate ART network (step 425). For example, the kinematics of object position (x, y), height, width (h, w), and time of day may be passed to the TOD-position network 306. As described above, the ART network may respond by mapping the inputs to an existing cluster and, using the inputs, update that cluster or create a new cluster (step 430).

Figure 5:
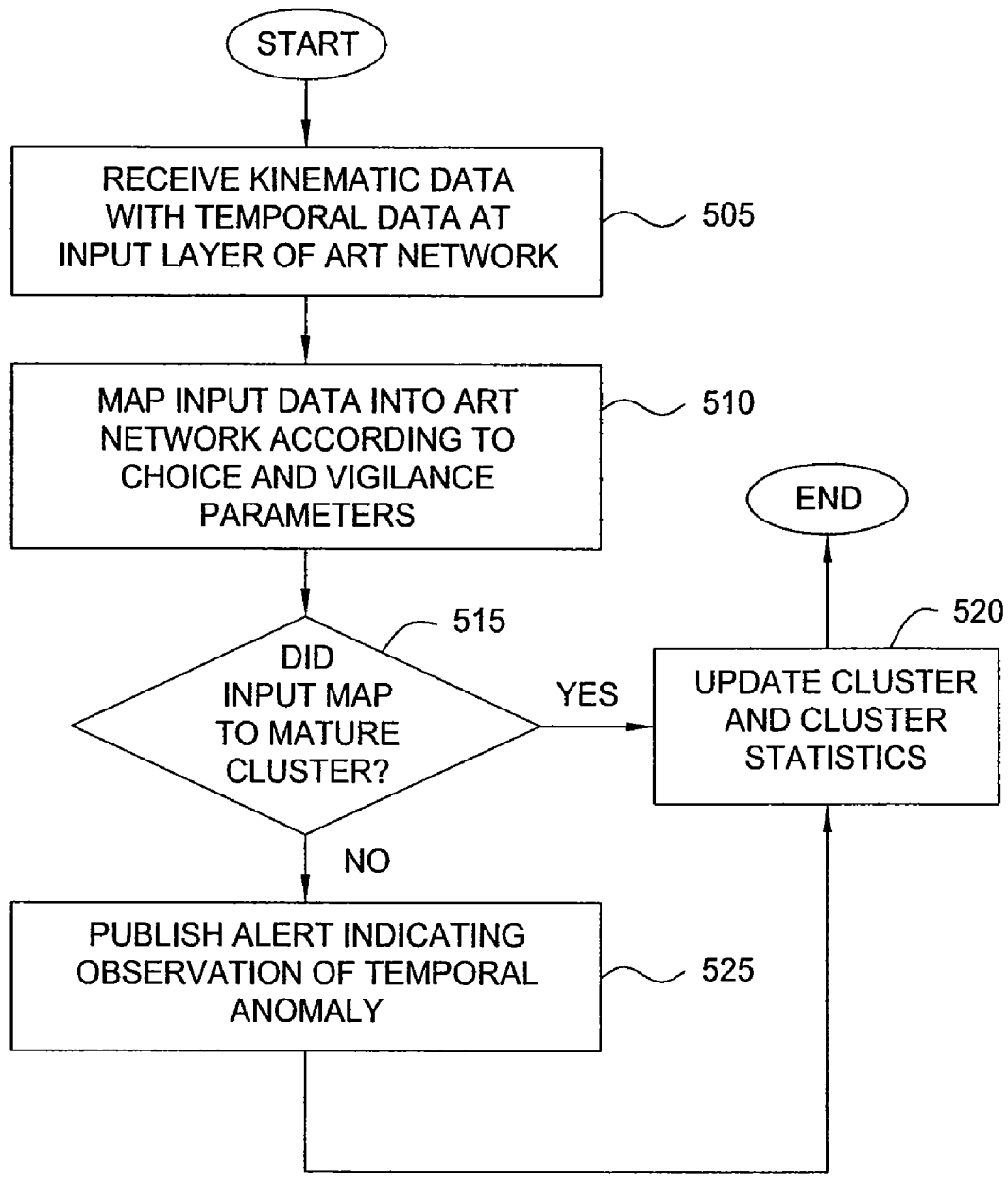
FIG. 5 illustrates a method for a video surveillance system to identify occurrences of unusual behavior (temporal anomalies) based on prior observations of a scene, according to one embodiment of the invention.

At step 435, the temporal anomaly detector may determine whether the ART network updated at step 430 is mature. That is, whether the ART network has been modeling behaviors observed in the scene by the computer vision engine 135 for a specified period of time (e.g., a period of four days for a time-of-day ART network cluster or a period of four weeks for a day-of-week ART network cluster). If not, i.e., if the cluster is still immature, then the method returns to step 415 where subsequent observations are mapped to the clusters in the ART networks of the TOD and DOW engines. However, if the ART network is mature (e.g., if the TOD network has been modeling scene behavior for more than four days), then at step 440, the clusters in the updated ART network are evaluated to determine whether an anomalous event has occurred. If so, the video surveillance system may publish an alert for users of the system. An example of a method for determining whether an anomalous event has occurred is shown in FIG. 5. After step 440, the method returns to step 415 where subsequent observations are mapped to the clusters in the ART networks of the TOD and DOW engines FIG. 5 illustrates a method 500 for a video surveillance system to identify occurrences of unusual behavior (temporal anomalies) based on prior observations of a scene, according to one embodiment of the invention. As shown, the method 500 begins at step 505 when an input layer of an ART network cluster of the TOD engine 305 or the DOW engine 310 receives kinematic data and temporal data corresponding to an object observed in the scene. For example, the input layer of the TOD-position network 306 may receive the (x, y) position, height, width, and time of day that a given object was observed in a scene. As noted above, such information may be output from the computer vision engine 135 as a stream of context events emitted at a rate of 5 Hz. In response, at step 510, the relevant ART network maps the input data to a cluster (or creates a new cluster) according to the choice and vigilance parameters specified for that cluster.

At step 515, the temporal anomaly detector may determine whether the input data mapped to a mature cluster. If so, at step 520, that cluster may be updated (i.e., the mean and variance may be updated using the input data received at step 505). Additionally, the temporal anomaly detector may update cluster statistics, e.g., a count of how many inputs have mapped to that cluster. When the input data is mapped to a mature cluster (steps 515 and 520), then the observation represented by the kinematic and temporal data may be characterized as being normal for the scene for the particular time of day (or day of week), relative to prior observation of behavior in the scene. However, if the input does not map to a mature cluster, then at step 525, the temporal anomaly detector may determine that the observation represented by the input data is a temporal anomaly, i.e., that the behavior observed in the scene is abnormal, relative to the time of day (or day of week) and to prior observation. Following step 525, the method proceeds to step 520 where the temporal anomaly detector updates cluster statistics. For example, assume the input data received at step 550 maps to an immature cluster. In such a case, the cluster may represent an emerging behavior in the scene. Thus, although an alert may be published, the cluster statistics are updated in order for to allow clusters representing emerging behavior to mature.

Figure 6:
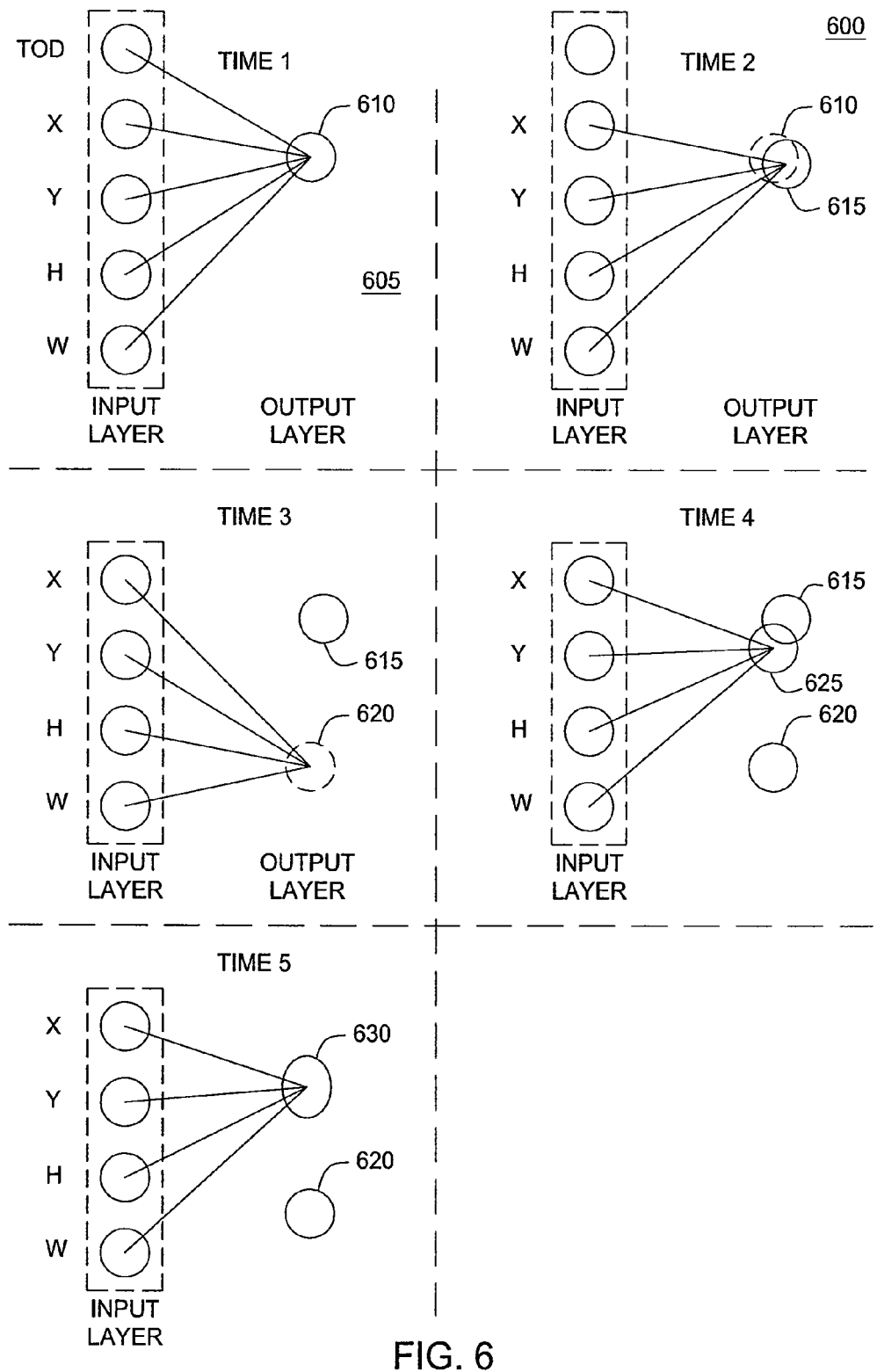
FIG. 6 illustrates a graphical representation of clusters in an ART network generated by a video surveillance system, according to one embodiment of the invention.

FIG. 6 illustrates a graphical representation of clusters in an ART network 605 used to model aspects of scene behavior relative to a time of day (and/or day of week), according to one embodiment of the invention. In this example, assume the inputs represent the input values parsed from the context event stream for the TOD-position network 306. Thus, as an object (e.g., a person) is observed in the scene by the computer vision engine 135, context event data may be supplied to the machine-learning engine 140 at a rate of 5 Hz. In such a case, the temporal anomaly detector 213 may receive an input group of position, height, width, and TOD five times per second, and map these inputs to clusters in TOD position network 306.

As shown, at time 1, a set of inputs map to a cluster 610 in ART network 605. Assume for this example that the ART network 605 represents the TOD position network 306 and that ART network 605 has been used to model scene behavior for at least the threshold period of time to be considered a mature ART network (e.g., for the TOD-position network 306, a period of four days). And further, that cluster 610 has been reinforced with enough input to be considered a mature cluster (i.e., a cluster modeling normal behavior for the particular time of day, based on the observations of other agents in the scene).

At time 2, assume a new set of kinematic and temporal data is supplied to ART network 605. Illustratively, the inputs map to the cluster 610, within the limits defined by mean and variance cluster 610. Accordingly, a temporal anomaly alert is not issued at time 2 as the behavior is within the model of normal behavior represented by cluster 610. At the same time, cluster 610 is updated using the set of inputs supplied at time 2. This results in a cluster 615 at a slightly different position (i.e., a cluster 610 with a slightly different mean and/or variance).

At time 3, assume that another set of kinematic and temporal data is supplied to ART network 605, which does not map to the cluster 615. And instead, the ART network 605 creates a new cluster 620 from this input. This could result from a foreground object being present at an (x, y) position and having an (h, w) height and width that is abnormal for the time of day, relative to prior observation. For example, a person appearing at the entrance of a retail store at 2:00 AM. However, it could also a result from a change in scene behavior. For example, a train schedule for a subway system could change. Doing so could result in people beginning to wait for trains in a region of the scene (i.e., at a subway platform) that was previously unoccupied at a particular time of day. In either case, the inputs mapping to cluster 620 may result in a temporal anomaly being issued. In subsequent frames, if cluster 620 is reinforced with additional input values (e.g., as people wait for a train according to the changed schedule at a particular time of day), then the temporal anomaly detector 213 may eventually classify cluster 620 as being a mature cluster, modeling an aspect of normal behavior for the scene, relative to the time of day input.

At time 4, assume that the computer vision engine 135 has continued to observe the scene and pass context events (kinematic and temporal data) to the temporal anomaly detector 213. As shown at time 4, cluster 625 has emerged in the ART network and has matured as modeling an aspect of normal behavior for the scene, relative to the time of day input. As shown, however, cluster 625 substantially overlaps with cluster 615. In such a case, as additional inputs are supplied to this ART network, clusters 615 and 625 may drift closer together—to the point that they overlap by an amount greater than a specified percentage of their areas. In one embodiment, when two clusters overlap by an amount that exceeds such a percentage, the ART network may merge the overlapping clusters. Doing so may help keep the number of distinct clusters managed by the ART network manageable. The results of the merger are shown at time 5, where cluster 630 has an elliptical shape derived form clusters 615 and 625. For example, as noted above, each cluster may have a mean along with a variance for the N-dimensional space modeled by the ART network. In such a case the mean and variance from cluster 615 and cluster 625 (at time 4) may be used to create a merged cluster 630 shown at time 5.

Advantageously, as described, embodiments of the invention provide techniques for analyzing a stream of video frames to identify temporal anomalies. More specifically, one embodiment includes a video surveillance system configured to identify when agents depicted in a video stream engage in anomalous behavior, relative to the time-of-day (TOD) or day-of-week (DOW) at which the behavior occurs. In one embodiment, a machine-learning engine may establish the normalcy of a scene by observing the scene over a specified period of time. Once the observations of the scene have matured, the actions of agents in the scene may be evaluated and classified as normal or abnormal temporal behavior, relative to the past observations.

While the foregoing is directed to embodiments of the present invention, other and further embodiments of the invention may be devised without departing from the basic scope thereof, and the scope thereof is determined by the claims that follow.

What is claimed is:

1. A computer-implemented method for analyzing a sequence of video frames depicting a scene captured by a video camera, the method comprising:
   receiving a set of kinematic data derived by a computer vision engine observing a foreground object in one of the frames of video;
   receiving temporal data specifying when the foreground object was observed in one of the frames of video;
   passing the set of kinematic data and the temporal data to an adaptive resonance theory (ART) network, wherein the ART network models observed behavior of a plurality of foreground objects observed in the scene, relative to the kinematic data and the temporal data;
   evaluating one or more clusters of the ART network to determine whether the set of kinematic data and temporal data passed to the ART network are indicative of an occurrence of a temporally anomaly; and
   upon determining a temporal anomaly has occurred, publishing an alert message.

2. The computer-implemented method of claim 1, wherein the temporal data specifies a time of day when the foreground object was observed in one of the frames of video.

3. The computer-implemented method of claim 2, further comprising, prior to publishing the alert message, determining that the ART network has modeled the observed behavior of the plurality of foreground objects in the scene for a threshold period of time.

4. The computer-implemented method of claim 1, wherein the temporal data specifies a day of week when the foreground object was observed in one of the frames of video.

5. The computer-implemented method of claim 4, further comprising, prior to publishing the alert message, determining that the ART network has modeled the observed behavior of the plurality of foreground objects in the scene for a threshold period of time.

6. The computer-implemented method of claim 1, wherein the kinematic data includes a spatial position in a frame of video where the foreground object has been observed by the computer vision engine, a pixel-height of the foreground object and a pixel width of the foreground object.

7. The computer-implemented method of claim 1, wherein the kinematic data includes a spatial position in a frame of video where the foreground object has been observed by the computer vision engine, a velocity in a horizontal dimension of the foreground object, and a velocity of the foreground object in a vertical dimension.

8. The computer-implemented method of claim 1, wherein the kinematic data includes a spatial position in one of the frames of video where the foreground object has been observed by the computer vision engine, a rate of acceleration of the foreground object in a horizontal dimension and a rate of acceleration of the foreground object in a vertical dimension.

9. The computer-implemented method of claim 1, further comprising, merging two or more overlapping clusters in the ART network.

10. The computer-implemented method of claim 1, further comprising, removing one or more clusters in the ART network that have not been updated for a period exceeding a specified time period.

11. The computer-implemented method of claim 1, further comprising: updating the ART network based on the kinematic data and the temporal data.

12. The computer-implemented method of claim 11, wherein updating the ART network comprises one of:
(i) generating a new cluster at an initial position determined form the passed data inputs, wherein the new cluster includes an initial mean and a variance, and wherein the new cluster is bounded by a specified distance from the initial position for each dimension of data passed to the input layer;
(ii) updating a previously generated cluster by updating the position, mean and variance of the previously generated cluster.

13. The computer-implemented method of claim 1, wherein evaluating the one or more clusters of the ART network to determine whether the set of kinematic data and temporal data passed to the ART network are indicative of the occurrence of a temporally anomaly comprises one of (i) determining that the ART network generated a new cluster to model the kinematic data and the temporal data in the ART network and (ii) determining that the ART network mapped the kinematic data and the temporal data to a cluster in the ART network that has not been reinforced with a threshold number of inputs.

14. A computer-readable storage medium containing a program which, when executed by a processor, performs an operation for analyzing a sequence of video frames depicting a scene captured by a video camera, the operation comprising:
receiving a set of kinematic data derived by a computer vision engine observing a foreground object in one of the frames of video;
receiving temporal data specifying when the foreground object was observed in one of the frames of video;
passing the set of kinematic data and the temporal data to an adaptive resonance theory (ART) network, wherein the ART network models observed behavior of a plurality of foreground objects observed in the scene, relative to the kinematic data and the temporal data;
evaluating one or more clusters of the ART network to determine whether the set of kinematic data and temporal data passed to the ART network are indicative of an occurrence of a temporally anomaly; and
upon determining a temporal anomaly has occurred, publishing an alert message.

15. The computer-readable storage medium of claim 14, wherein the temporal data specifies at least one of a time of day when the foreground object was observed in one of the frames of video and a day of week when the foreground object was observed in one of the frames of video.

16. The computer-readable storage medium of claim 15, wherein the operation further comprises, prior to publishing the alert message, determining that the ART network has modeled the observed behavior of the plurality of foreground objects in the scene for a threshold period of time.

17. The computer-readable storage medium of claim 14, wherein the kinematic data includes at least one of: (i) a spatial position in a frame of video where the foreground object has been observed by the computer vision engine and a pixel-height of the foreground object and a pixel width of the foreground object (ii) a spatial position in one of the frames of video where the foreground object has been observed by the computer vision engine, a velocity in a horizontal dimension of the foreground object, and a velocity of the foreground object in a vertical dimension, and (iii) a spatial position in one of the frames of video where the foreground object has been observed by the computer vision engine, a rate of acceleration of the foreground object in a horizontal dimension and a rate of acceleration of the foreground object in a vertical dimension.

18. The computer-readable storage medium of claim 14, wherein the operation further comprises: updating the ART network based on the kinematic data and the temporal data.

19. The computer-readable storage medium of claim 18, wherein updating the ART network comprises one of:
(i) generating a new cluster at an initial position determined form the passed data inputs, wherein the new cluster includes an initial mean and a variance, and wherein the new cluster is bounded by a specified distance from the initial position for each dimension of data passed to the input layer;
(ii) updating a previously generated cluster by updating the position, mean and variance of the previously generated cluster.

20. A system, comprising:
a video input source configured to provide a sequence of video frames, each depicting a scene;
a processor; and
a memory containing a program, which, when executed on the processor is configured to perform an operation for analyzing the scene, as depicted by the sequence of video frames captured by the video input source, the operation comprising:
receiving a set of kinematic data derived by a computer vision engine observing a foreground object in one of the frames of video,
receiving temporal data specifying when the foreground object was observed in one of the frames of video,
passing the set of kinematic data and the temporal data to an adaptive resonance theory (ART) network, wherein the ART network models observed behavior of a plurality of foreground objects observed in the scene, relative to the kinematic data and the temporal data,
evaluating one or more clusters of the ART network to determine whether the set of kinematic data and temporal data passed to the ART network are indicative of an occurrence of a temporally anomaly, and
upon determining a temporal anomaly has occurred, publishing an alert message.

21. The system of claim 20, wherein the temporal data specifies at least one of a time of day when the foreground object was observed in one of the frames of video and a day of week when the foreground object was observed in one of the frames of video.

22. The system of claim 21, wherein the operation further comprises, prior to publishing the alert message, determining that the ART network has modeled the observed behavior of the plurality of foreground objects in the scene for a threshold period of time.

23. The system of claim 20, wherein the kinematic data includes at least one of: (i) a spatial position in a frame of video where the foreground object has been observed by the computer vision engine and a pixel-height of the foreground object and a pixel width of the foreground object (ii) a spatial position in one of the frames of video where the foreground object has been observed by the computer vision engine, a velocity in a horizontal dimension of the foreground object, and a velocity of the foreground object in a vertical dimension, and (iii) a spatial position in one of the frames of video where the foreground object has been observed by the computer vision engine, a rate of acceleration of the foreground object in a horizontal dimension and a rate of acceleration of the foreground object in a vertical dimension.

24. The system of claim 20, wherein the operation further comprises: updating the ART network based on the kinematic data and the temporal data.

25. The system of claim 24, wherein updating the ART network comprises one of:
   (i) generating a new cluster at an initial position determined form the passed data inputs, wherein the new cluster includes an initial mean and a variance, and wherein the new cluster is bounded by a specified distance from the initial position for each dimension of data passed to the input layer;
   (ii) updating a previously generated cluster by updating the position, mean and variance of the previously generated cluster.

* * * * *